United States Patent

Sanders et al.

(10) Patent No.: US 9,716,638 B1
(45) Date of Patent: Jul. 25, 2017

(54) PUSH PULL DATA COLLECTION

(71) Applicant: Xangati Inc., Los Altos, CA (US)

(72) Inventors: Derek Sanders, Saratoga, CA (US);
Rangaswamy Jagannathan, Sunnyvale, CA (US); Rosanna Lee, Palo Alto, CA (US)

(73) Assignee: Virtual Instruments, San Jose, CA (US)

( * ) Notice: Subject to any disclaimer, the term of this patent is extended or adjusted under 35 U.S.C. 154(b) by 0 days.

(21) Appl. No.: 14/834,367

(22) Filed: Aug. 24, 2015

(51) Int. Cl.
*G06F 15/173* (2006.01)
*H04L 12/26* (2006.01)

(52) U.S. Cl.
CPC ........ *H04L 43/067* (2013.01); *H04L 43/0876* (2013.01)

(58) Field of Classification Search
CPC .......................... H04L 43/067; H04L 43/0876
USPC ....... 709/201, 202, 203, 217, 219, 220, 221, 709/223, 224
See application file for complete search history.

(56) References Cited

U.S. PATENT DOCUMENTS

| | | | | |
|---|---|---|---|---|
| 6,363,411 B1* | 3/2002 | Dugan | ............... | H04M 3/42136 379/201.01 |
| 6,779,030 B1* | 8/2004 | Dugan | ............... | H04M 3/42136 379/221.08 |
| 7,209,964 B2* | 4/2007 | Dugan | ............... | H04M 3/42136 379/221.08 |
| 7,895,320 B1* | 2/2011 | Oggerino | ............... | H04L 41/507 709/202 |
| 2005/0021713 A1* | 1/2005 | Dugan | ............... | H04M 3/42136 709/223 |
| 2011/0060831 A1* | 3/2011 | Ishii | ....................... | H04N 7/181 709/224 |

* cited by examiner

*Primary Examiner* — Davoud Zand

(57) ABSTRACT

A monitoring device responds to status data pushed from a network device, and also manages a link with another network device, the link allowing the monitoring device to pull status data from the second network device. The monitoring device receives packets including status, the data indicating activity for one or more clock ticks. The monitoring device can compute statistical measures, rather than the network device. The monitoring device maintains the status data in a buffer. The monitoring device lags actual activity, but has is more likely to capture delayed packets. The network device sends packets as wrappers, each wrapper indicating sets of status information. When the information in a wrapper crosses a clock tick boundary, the monitoring device allocates reported activity among clock ticks, assuming that activity follows a uniform distribution.

13 Claims, 3 Drawing Sheets

Figure 2
System 200

201

202

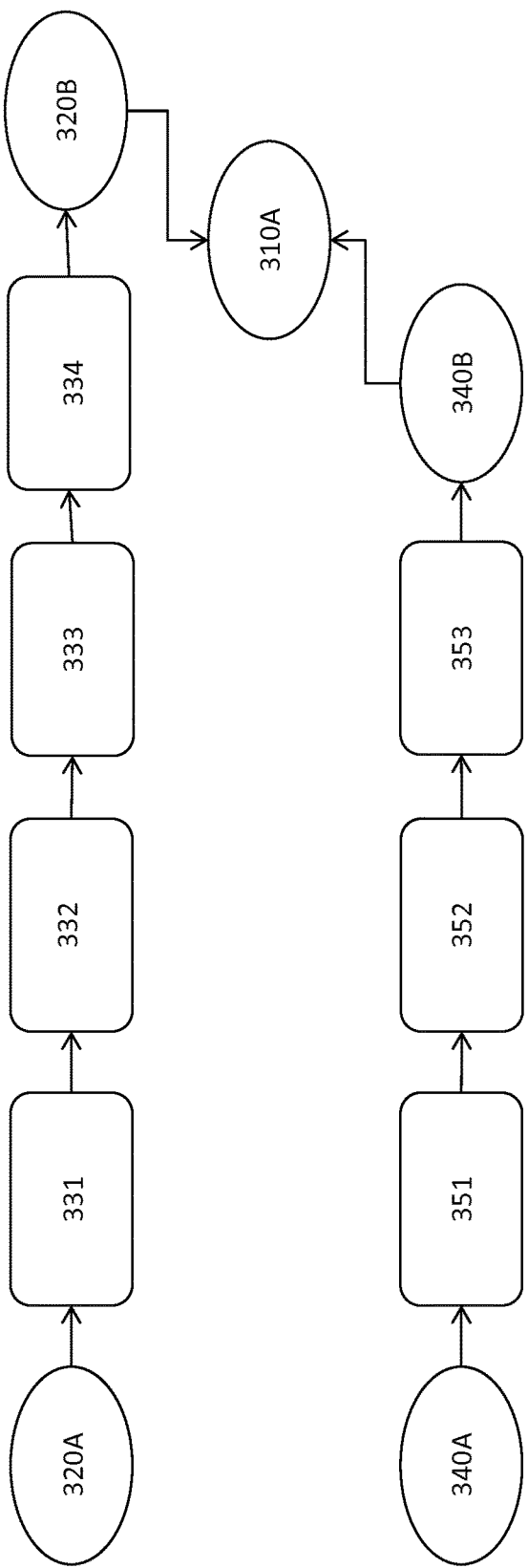

PUSH PULL DATA COLLECTION

RELATED DOCUMENTS

The specification, filed on Jun. 9, 2017, is a continuation and does not contain "new matter."

This Application relates to devices, methods, and techniques, such as described in the following documents, and documents quoted therein or related thereto:

- U.S. application Ser. No. 12/180,437; filed Jul. 25, 2008; in the name of inventors Derek SANDERS, Rangaswamy JAGANNATHAN, Rosanna LEE, Kishor KAKATKAR, and Xiaohong PAN; titled "Symptom Detection Using Behavior Probability Density, Network Monitoring of Multiple Observation Values Types, and Network Monitoring Using Orthogonal Profiling Dimensions,";
- U.S. application Ser. No. 12/791,704; filed Jun. 1, 2010; in the name of inventors Kishor KAKATKAR, Roy NAKASHIMA, Rosanna LEE, Jing LIU, Derek SANDERS, Rangaswamy JAGANNATHAN, and David MESSINA; titled "Recording, Replay, and Sharing of Live Network Monitoring Views,";
- U.S. Provisional Application Ser. No. 62/041,130; filed Aug. 24, 2014; in the name of inventors Rosanna LEE, Rangaswamy JAGANNATHAN, and Jing LIU; titled "Push Pull Data Collection,";
- U.S. application Ser. No. 14/834,367; filed Aug. 24, 2015; in the name of inventors Rosanna LEE, Rangaswamy JAGANNATHAN, and Derek SANDERS; titled "Push Pull Data Collection,";
- U.S. Provisional Application Ser. No. 62/041,141; filed Aug. 24, 2014; in the name of inventors Rosanna LEE, Rangaswamy JAGANNATHAN, and Jing LIU; titled "Cross-silo Time Stitching,";
- U.S. application Ser. No. 14/834,371; filed Aug. 24, 2015; in the name of inventors Rosanna LEE, Rangaswamy JAGANNATHAN, and Derek SANDERS; titled "Cross-silo Time Stitching,".
- U.S. Provisional Application Ser. No. 62/041,140; filed Aug. 24, 2014; in the name of inventors Jing LIU, Rangaswamy JAGANNATHAN, and Rosanna LEE; titled "Enhanced flow processing,";
- U.S. application Ser. No. 14/834,424; filed Aug. 24, 2015; in the name of inventors Rosanna LEE, Rangaswamy JAGANNATHAN, and Derek SANDERS; titled "Enhanced flow processing,";
- U.S. Provisional Application Ser. No. 62/041,143; filed Aug. 24, 2014; in the name of inventors Derek SANDERS, Rangaswamy JAGANNATHAN, and Rosanna LEE; titled "Self-learning and best-practices profiling and alerting with relative and absolute capacity,";
- U.S. Provisional Application Ser. No. 62/041,135; filed Aug. 24, 2014; in the name of inventors Rosanna LEE, Derek SANDERS, Rangaswamy JAGANNATHAN, and Jing LIU; titled "Storm detection, analysis, and remediation,";
- A Technical Appendix having 1 page, titled "Xangati solution architecture extensible across cloud applications and cloud stacks," a copy of which is enclosed herewith, and incorporated by reference as if fully set forth herein.

Each and every one of these documents, as well as all documents cited therein, is hereby incorporated by reference as if fully recited herein.

This Application claims priority of each and every one of these documents, as well as to all documents incorporated therein, to the fullest extent possible.

BACKGROUND

Field of the Disclosure

This Application can relate to push pull data collection, and other matters. For example, this Application can include information relating to push pull data collection in a distributed network monitoring environment.

Other and further possibilities are described herein.

Related Art

One problem that has arisen, particularly in the field of network monitoring, is that some network devices will provide status data on their own initiative (or for an extended period of time, after having been asked to do so), such as routers in a distributed network monitoring environment. For example, at least some routers in a distributed network monitoring environment will, upon request, provide status data periodically, such as each second, to the requesting device. For example, that status data can take the form of message packets indicating the amount of network traffic they have transferred from one endpoint to another in a selected time frame. In contrast, other network devices will generally only provide status data when explicitly requested to do so, such as in the form of a message packet requesting that status data. For example, at least some commercially available virtual machines (VM's) will provide status data only when requested, and will only provide that status data in the form of a message packet either (1) providing raw data, such as a count of access requests to data storage made by that virtual machine, or (2) providing a summary of information, such as an average of the number of access requests to data storage, but for a relatively longer time than routers or other network devices might provide.

This can present multiple problems for monitoring devices in the distributed network monitoring environment.

First, when a monitoring device receives information indicating status data for different amounts of time for distinct network devices, the monitoring device might have difficulty reconciling, within the meaning of the distributed network monitoring environment, the status data provided by a first device with status data provided by a second device.

Second, when a monitoring device receives information indicating differing types of status data for distinct network devices, that monitoring device might have to determine for itself meaningful and reconcilable status data, within the meaning of the distributed network monitoring environment, from the status data provided by the first device (in a first format) and the status data provided by a second device (in a second format).

Third, when a monitoring device requests status data from a particular network device, either the monitoring device or the particular network device, or both, might be unable to handle the request within a sufficiently short time duration that the status data can still be included with other status data in a meaningful network monitoring report, within the meaning of the distributed network monitoring environment.

Fourth, when a monitoring device requests status data from a particular network device, either the monitoring device or the particular network device, or both, might be unable to handle their other tasks within a relatively reasonable time duration, with the effect that the request for status data to the particular network device, or the response from the particular network device, might degrade the ability of that network device within the distributed network monitoring environment.

One possibility is sometimes referred to as "virtual infrastructure operations management." The possibility can provide that virtual machines implemented at the network device are each outfitted with their own local monitoring elements. Those local monitoring elements might be disposed to measure resource utilization metrics, to report (post mortem, that is, after the fact) any errors discovered about performance of the network device or its virtual machines, or to perform capacity management. While this possibility might have the capability of performing these functions at the network device, with the effect that the monitoring device is not burdened with those functions, the possibility can be subject to several drawbacks.

- One drawback is that the local monitoring elements cannot conveniently or easily be disposed to obtain information from more than one "silo," that is, information with respect to a function performed by the network device. Thus, the push data and the pull data cannot conveniently or easily be coordinated to provide a unitary in-order time record. Moreover, status data in differing formats or embodying differing concepts would have to be collated by each individual network device's local monitoring elements, with the strong probability that differences or errors would creep into the implementation of those local monitoring elements.
- Another drawback is that the network device's local monitoring element cannot conveniently or easily be disposed to be coordinated with status data with respect to any other network device. For example, a virtual machine operating on a server might be able to provide status data its own operation, but it would not be able to coordinate its own status data with another network device, such as a data storage element. Moreover, a local monitoring element for a virtual machine operating on a server would not be able to conveniently or easily manipulate status data in another format, such as status data from another network device.

Another possibility might be to install a reporting element, such as a software program including instructions capable of being interpreted by the network device, or another computing device accessible to the network device, to collect status data and send that information to one or more monitoring devices, in a manner convenient to those monitoring devices. While this possibility might have the capability of ameliorating difficulties the monitoring devices might have in processing status data they receive from network devices, the possibility can be subject to several drawbacks.

- One drawback is that the reporting element might be incompatible with some other element of the network device, whether hardware, software, or otherwise. For example, if the reporting element relies on a particular aspect of the network device's operating system, or of a guest operating system in a virtual machine in the network device, there is always a chance that any upgrades or other changes in one or more of those operating systems will cause the reporting element to perform improperly, or vice versa.

Another drawback is that, for these and other reasons, historically, operators of network devices have been substantially hostile to such reporting elements.

Some Drawbacks of the Known Art

Each of these issues, either alone or in combination with others, at some times, or in some conditions, can difficulty in aspects of effective and efficient collation of status data from more than one network device, more than one type of network device, or more than one format or type of status data, or otherwise, particularly in a distributed network monitoring environment.

BRIEF SUMMARY

A system includes apparatus, such as a network monitoring device, capable of responding to status data pushed from a network device, and of maintaining that status data in an accessible database.

In one embodiment (in a push circumstance for status data), the network monitoring device receives message packets from a network device that can include status data information, such as (in the case of network traffic status data) a number of message packets and a number of octets processed by the network device in a recent time duration (sometimes referred to herein as a "clock tick"). For example, the network device can send message packets each second, which each include status data information for the previous clock tick. In such cases, the network device can send each message packet as a wrapper, the wrapper including sets of status data information, each set of status data information being associated with an earlier clock tick. As network traffic is sometimes delayed, it is not necessarily so that the status data message packets arrive in order. Accordingly, the network monitoring device maintains a buffer of one to two minutes (that is, 60-120 seconds or, equivalently, 60-120 clock ticks). The inventors have found that with a buffer of one minute, approximately 95% of all status data message packets are retrieved by the network monitoring device before the buffer is recycled, and with a buffer of two minutes, approximately 99% of all status data message packets are retrieved by the network monitoring device before the buffer is recycled. An even larger buffer would be likely to maintain an even greater probability that status data message packets would arrive before the buffer had to be recycled. Whether this is worth it is up to the operator of the network monitoring device and its users.

In one embodiment, the network monitoring device assigns each wrapper in a status data message packet a beginning and ending time stamp, with the effect that the network monitoring device can determine a time duration of the period for which the network device is reporting (usually exactly one clock tick, but it is possible to be more or less); and whether the status data message packet is appropriately associated with the most recent clock tick, or whether the status data message packet was delayed in transit, and belongs to an earlier clock tick. In either case, the system assigns the status data in the message packet to the proper clock tick, maintains that information in the buffer, and when the buffer is recycled to that point, emits one or more messages to users to present live (or recordable) status data thereto.

In one embodiment, the network monitoring device assumes that actual status data indicates activity that was processed by the network device in a substantially uniform distribution. For example, if the status data message packet indicates that the network device processed 600 items in the past 10 clock ticks, the network monitoring device assumes, unless told otherwise, that there were 60 data items for each such clock tick. If a status data message packet crosses a clock tick boundary, the network monitoring device can divide the message packet into more than one such message packet, assigning data items to each portion of the original message packet in response to where it crossed the clock tick boundary. This is described in other and further detail herein.

In different circumstances (that is, in a pull circumstance for status data), the network monitoring device can obtain status data message packets from a network device by communicating with the network device in a similar manner as a client-server relationship. In such cases, the network monitoring device would be similar to the client, thus making requests for status data from the network device, and the network device would be similar to the server, making responses including that status data information. However, in many cases, such as with vmWare devices, the network device is unwilling to provide status data message packets as often as each clock tick, so the network device accumulates status data for longer, such as about 20 seconds for data storage access information maintained by virtual machines. Even this value can vary, as resource usage at the virtual machine can cause the virtual machine to provide status data message packet less frequently or with less status data, such as possibly as little as only five seconds for data storage access information.

Possibly, the network device can provide a set of average usage values for the reported time duration as the status data (sometimes referred to herein as "cooked" status data), or can provide a set of register values at the start and end of the reported time duration as the status data (sometimes referred to herein as "raw" status data). In the latter such case, the network monitoring device determines the format of the status data information in the message packet, computes the cooked status data on behalf of the network device, and maintains the cooked status data in the buffer at the appropriate one or more clock ticks. Similar to the process described above, the network monitoring device allocates the status data, from the network device, among the clock ticks, assuming that activity follows a substantially uniform distribution.

Moreover, the network monitoring device manages its communication with the network device, so as to manage how much status data it can retrieve, how much load it is placing on its "server," the network device, and how much load it is placing on itself. When the network monitoring device places excess load on the network device, the latter has the possibility of throttling back the amount of status data it provides, or the number of message packet it provides, or the fidelity of the status data to actual measurements, or even whether it is willing to communicate with the network monitoring device at all.

Other and further details are included herein.

This Application

After reading this application, those skilled in the art would recognize that techniques shown in this application are applicable to more than just the specific embodiments shown herein. For example, the applicability of the techniques shown herein can broadly encompass a wide variety of network monitoring techniques. These can include "push" techniques, in which the network device pushes the status data out to the network monitoring device, "pull" techniques, in which the network monitoring device explicitly requests status data information from the network device, "polling" techniques, in which the network monitoring device looks to each network device in a round-robin or similar fashion to determine if any status data information is available, "shared memory" techniques, in which the network monitoring device and the network device can each include one or more portions of memory in which status data information can be maintained, and otherwise.

Moreover, after reading this application, those skilled in the art would recognize that techniques shown in this application are applicable, or can be made applicable with relatively small effort that does not include undue experiment or further invention, to circumstances in which the status data information is fuzzy, probabilistic, unclear, unknown, or otherwise. For example, while this Application is primarily directed to status data information that can be explicitly stated and maintained in non-volatile (or volatile) storage, or in memory or mass storage, in the context of the invention, there is no particular requirement for any such limitation. In such cases, the status data can include information that is only meaningful when examined over a period of time, or when combined with other information, or when interpreted by a user—or by another computing device, a machine learning system, an Artificial Intelligence system, one or more human beings (possibly with expert knowledge).

Moreover, after reading this application, those skilled in the art would recognize that techniques shown in this application are applicable, or can be made applicable with relatively small effort that does not include undue experiment or further invention, to circumstances in which the status data information is maintained in a data structure other than a buffer, such as when the status data information is maintained due to circumstances other than network delay. For example, the status data can be maintained in a data structure that includes one or more hashing techniques, one or more hierarchical techniques (such as a tree structure, directed graph, or lattice), one or more holographic techniques (such as a content-addressable memory, a Kohonen network, a biochemical computing device, or otherwise), or some other technique.

Moreover, after reading this application, those skilled in the art would recognize that techniques shown in this application are applicable, to many other circumstances not explicitly described, such as status data that is distinguished by its application to activity with respect to location in an area or region (such as a particular set of network devices or endpoints in one or more selected places), or in another state-space (such as a particular set of network devices or endpoints using one or more virtual machines, virtual machine applications, real or virtual machine communication ports, or otherwise).

Possible Applicability

After reading this Application, those skilled in the art would recognize that techniques shown herein are applicable to more than just the specific embodiments shown herein, are within the scope and spirit of the invention, and would not require undue experiment or further invention.

Some particular implementations could include one or more of the following:
  Use of push pull data collection in other types of network environments Other and further techniques, also shown or suggested by this Application, are also applicable to more than just the specific embodiments described herein.

BRIEF DESCRIPTION OF THE DRAWINGS

FIG. 2 shows a conceptual drawing of a status data buffer.

FIG. 3 shows a conceptual drawing of a method of operation.

DETAILED DESCRIPTION OF AN EMBODIMENT

Terminology

Generality of the Description

Figure 1:
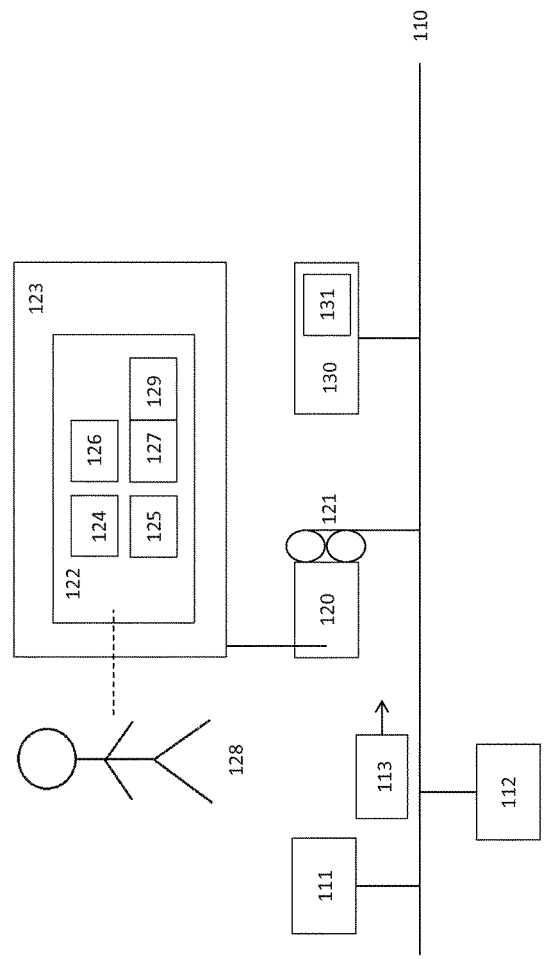
FIG. 1 shows a conceptual drawing of a system, and method of making the same.

Ideas and technologies shown or suggested by this Application should be thought of in their most general form, including without limitation, considering one or more of the following:

- The phrases and terms "Application," "this Application," "this Disclosure," and variants thereof, generally refer to this Specification, Drawings, Figures, and Claims, all other parts of this Application, and all facts known in the art at the time of filing, and all facts that can be rationally concluded therefrom.
- When an apparatus element or a method step is said to "include" or "perform," and variants thereof, or otherwise be restricted in some way, this Application should be read that the subpart of the apparatus element, or the sub-step of the method, and the restriction mentioned, is only optional, not required. After reading this Application, those skilled in the art would recognize that those apparatus elements or method steps need not necessarily include or perform those particular subparts or sub-steps. In the context of the invention, no such particular subparts or sub-steps are particularly required. In an alternative embodiment, apparatus elements or method steps without those sub-parts or sub-steps would be workable, are within the scope and spirit of the invention, and would not require undue experiment or further invention.
- The phrases and terms "in one example," "in one embodiment," "in one implementation," "in one scenario," "in possible examples," "in possible embodiments," "in possible implementations," "in possible scenario," and variants thereof, generally refer that a particular characteristic, feature, or structure, described herein is included in at least one embodiment of the invention. Multiple uses of this phrase do not necessarily all refer to the same embodiment. Rather, the specific particular characteristic, feature, or structure, described herein might be combined in any suitable manner into one or more distinct possible embodiments.
- The phrases and terms "perform," and variants thereof, generally refer (in the context of a program of instructions) any one or more means by which those instructions are executed or interpreted, or a device (such as a computing device) otherwise conducts the process indicated by that program of instructions. A program of instructions can be detected or interpreted at one location, and executed or its process conducted at another location. A program of instructions can be performed by a portion of a device, rather than the entire device, or by one or more devices, or by one or more portions of devices (the same device or different devices). A program of instructions can be per-formed by an emulated device, such as a virtual machine, "sandbox" environment, or otherwise. A program of instructions can be performed in part, halted or paused or stopped, transferred to another device, in whole or in part, and possibly continued.
- The phrases and terms "relatively," and variants thereof, generally refer any relationship in which a comparison is possible, including without limitation "relatively less," "relatively more," and otherwise. In the context of the invention, where a measure or value is indicated to have a relationship "relatively," that relationship need not be precise, need not be well-defined, and need not be by comparison with any particular or specific other measure or value. For one example, whenever a measure or value is "relatively increased" or "relatively more," that comparison need not be with respect to any known measure or value, but might be with respect to a measure or value held by that measurement or value at another place or time, or with respect to a measure or value commonly used in the art.
- The phrases and terms "substantially," and variants thereof, generally refer any circumstance in which a determination, measure, value, or otherwise; is equal, equivalent, nearly equal, nearly equivalent, or approximately; what the measure or value is recited to be. For example, the phrases and terms "substantially all," and variants thereof, generally refer any circumstance in which all, except possibly a relatively minor amount or number, have the stated property. For example, the phrases and terms "substantially none," and variants thereof, generally refer any circumstance in which none, except possibly a relatively minor amount or number, have the stated property. For example, the phrases and terms "substantial effect," and variants thereof, generally refer any circumstance in which an effect might be detected or determined.
- The phrases and terms "techniques," and variants thereof, generally refer any material suitable for description, including without limitation all such material within the scope of patentable subject matter. Whenever a method step is described, those skilled in the art would know, without further invention or undue experiment, that this application thereby also describes (1) at least a first product, such as one maintaining instructions that are interpretable by a computing device, where those instructions direct one or more devices to perform that method step; and (2) at least a second product, such as one capable of performing that method step.

After reading this application, those skilled in the art would realize that the invention is not in any way limited to the specifics of any particular example. Many other variations are possible that remain within the content, scope and spirit of the invention, and these variations would be clear to those skilled in the art, without further invention or undue experiment.

Specific Phrases and Terms

One or more of the following phrases and terms can be used in this Application. Where clear from the context, they can have the meanings described herein. After reading this Application, those skilled in the art would recognize that these phrases and terms can have other, broader and further, meanings as well or instead.

Ideas and technologies shown or suggested by, or specific to, this Application should be thought of in their most general form, including without limitation, considering one or more of the following:

- The terms and phrases "collate," and variants thereof, generally indicate that the status data information can be collected in an arrangement, order, structure, or otherwise, not equal to the way it was collected. For example, status data information can be considered to be collated when it arrives out of time order at the network monitoring device from the network device, due to network delay or some other characteristic of the communication between the network monitoring device and the network device. Alternatively, status data can be considered to be collated when it arrives in a first format and is converted to a second format by one or more computing devices.

The terms and phrases "data storage," and variants thereof, generally indicate one or more real or virtual devices that are capable of maintaining data or information for later access, either by the same device that stored the data or information, or by another device.

The terms and phrases "monitoring device," "network monitoring," and variants thereof, generally indicate one or more real or virtual devices that can perform the functions of monitoring network devices, or their activity, such as by determining or gleaning status data information, collating that status data information, and processing that collated status data information.

The terms and phrases "network device," and variants thereof, generally indicate any device including computational capacity, such as a real or virtual processing substrate, a real or virtual data storage element, a real or virtual network communication element, a real or virtual memory, or otherwise.

The terms and phrases "local monitoring element," "reporting element," and variants thereof, generally indicate any portion of one or more network devices, or some combination or conjunction thereof, that can include the capability of generating a report of status data information. For example, a network device that can include a virtual machine, when the virtual machine can provide status data information to the network monitoring device, can include a reporting element.

The terms and phrases "status data," and variants thereof, generally indicate any information indicating activity or capability of a network device, such as processing capacity, memory capacity, storage capacity, network activity, or otherwise. Status data is not generally limited to capacity, and can include expandability, latency, reliability, size, or any other feature useful in the field of computing that can include computing devices.

The terms and phrases "silo," and variants thereof, generally indicate any division of status data information into categories of activity, capability, capacity, or otherwise. For example, network bandwidth and processing power can be in distinct silos of status data information, as can the difference between either of those measures and any measure from the group: memory, data storage, application servers, virtual machine capacity, or otherwise.

Any terms appearing in the figures but not explicitly described in this Application should be apparent to those skilled in the art.

After reading this application, those skilled in the art would realize that the invention is not in any way limited to the specifics of any particular example. Many other variations are possible that remain within the content, scope and spirit of the invention, and these variations would be clear to those skilled in the art, without undue experiment or further invention.

FIG. 1

FIG. 1 shows a conceptual drawing of a system, and method of making the same.

In possible implementations, a system 100 can include elements described herein, other elements shown in the figure, and possibly other elements. Not all elements are required. Elements should be considered optional, unless otherwise specified or unless clearly obvious for operation of the system. Elements may also be embodied in one or more devices, not necessarily in only a single device.

FIG. 1, Element Identifiers

System elements and sub-elements are sometimes described herein with respect to the following reference numbers and/or names:

100—System
110—Communication network
111—Network devices
112—Network monitoring devices
113—Message packet
120—Computing devices
121—Port(s)
122—Virtual machine
123—Hypervisor
124—Host operating system
125—Guest operating system
126—Application servers
127—Virtual desktop
128—User(s)
129—Virtual desktop implementation
130—Database
131—Virtual data stores FIG. 1, Configuration of Elements A system 100 includes elements described herein, other elements shown in the figure, and possibly other elements. Not all elements are required. Elements should be considered optional, unless otherwise specified or unless clearly obvious for operation of the system.

Communication Network

The system 100 can include a communication network 110, suitably disposed to interact with other elements described herein. In general, when elements described herein communicate, they do so using the communication network 110. The communication network 110 can include one or more network devices 111, such as network routers, and can be disposed as a TCP/IP network, an IEEE 802.11 wireless communication network 110, an Ethernet or other local communication network 110, a subdivision of the Internet, or otherwise. The communication network 110 can also include one or more network monitoring devices 112, coupled to the communication network 110, and capable of reviewing message packets 113 that are transmitted on the communication network 110, without interfering with transmission or reception of those message packet 113.

Computing Device

The system 100 (in particular, the network devices 111) can include one or more computing devices 120, such as computing servers, quantum computers, or other types of computing devices. Each particular computing device 120 of the one or more computing devices 120 can include one or more ports 121 coupling the particular computing device 120 to the communication network 110, with the effect that the particular computing device 120 can exchange message packets 113 with other devices coupled to the communication network 110.

Virtual Machine

Each particular computing device 120 can also include one or more virtual machines 122, each virtual machine 122 being capable of being controlled by a hypervisor 123 that is executed by the particular computing device 120. Each virtual machine 122 can include a host operating system 124 (controlled by the hypervisor 123) and one or more guest operating systems 125 (each controlled by a host operating system 124). Each virtual machine 122 can also include one or more application servers 126 (controlled by the guest operating system 125), each capable of receiving messages from a client device (a particular network device 111, as otherwise and further described herein) and capable of responding to those messages.

Virtual Desktop

Each virtual machine 122 can execute an application server 126 that presents a virtual desktop 127 to one or more users 128. In such cases, the virtual desktop 127 can include one or more output elements (such as a display screen and/or a speaker), and be responsive to one or more input devices (such as a keyboard and/or a pointing device), each showing one or more application programs executing in a windowing system, with the effect that a particular user 128 can interact with the virtual desktop 127, using the communication network 110, as if the particular user 128 were physically present at the virtual machine 122 and, by implication, at the particular computing device 120 on which that virtual machine 122 is executed.

Virtual Desktop Implementation

In one embodiment, one or more of those virtual desktops 127 can include, or be coupled to, a virtual desktop implementation 129. The virtual desktop implementation 129 can include a software program executed by the virtual machine 122, capable of exchanging message packets 113 with the user 128, in which the message packets 113 can be substantially compressed and can include substantial error correcting coding. This can have the effect that communication between the virtual desktop 127 and the user 128 can be sufficiently smooth as if the virtual desktop 127 and the user 128 were physically local, and that their exchange of messages using the communication network 110 were substantially invisible to the user 128.

Database

In one embodiment, the system 100 can include a database 130, or other data maintenance or data storage element, capable of maintaining status data information communicated, using the message packets 113, between the one or more network devices 111 and the one or more network monitoring devices 112. The database 130 can be disposed substantially locally, such as substantially directly coupled to the communication network 110, or can be disposed substantially remotely, such as substantially indirectly coupled to other elements that are eventually coupled to the communication network 110. The database 130 can include one or more real or virtual data stores 131, such as disk drives, flash drives, or other storage techniques.

Network Monitoring

In one embodiment, the system 100 can include one or more network monitoring devices 112, as described herein. The network monitoring devices 112 can be disposed to exchange message packets 113 with the one or more network devices 111, the one or more computing devices 120, the one or more virtual machines 122, the one or more virtual desktop implementations 129, the one or more databases 130, and any other elements coupled to the system 100. For example, the one or more network monitoring devices 112 can exchange message packets 113 with the one or more network devices 111, with the effect that the network monitoring devices 112 can receive status data information with respect to any interaction in the system 100. This can include interactions between any pair of devices (whether same or different) described herein.

Alternative Embodiments

After reading this Application, those having ordinary skill in the art will recognize that the particular elements described herein, their particular cooperation and organization, and their particular use as described herein, can be substantially altered while remaining within the scope and spirit of the invention, and that such alterations would work without undue experiment or further invention.

FIG. 2

FIG. 2 shows a conceptual drawing of a status data buffer.

In possible implementations, a system 100 can include elements described herein, other elements shown in the figure, and possibly other elements. Not all elements are required. Elements should be considered optional, unless otherwise specified or unless clearly obvious for operation of the system. Elements may also be embodied in one or more devices, not necessarily in only a single device.

FIG. 2, Element Identifiers

System elements and sub-elements are sometimes described herein with respect to the following reference numbers and/or names:

201—Status data buffer
202—Clock tick(s)

FIG. 2, Configuration of Elements

The system 100 can include a status data buffer 201, disposed to maintain a selected number of clock ticks 202 of status data information. For example, the buffer 201 can be one or two minutes of time, while each clock tick 202 is assigned one second of time. This would mean that the buffer is 60-120 clock ticks 202 in width, and has room for inserting status data information (or pointers thereto), upon receipt. If status data information is received but is out of date (that is, for a buffer 201 that is one minute wide, the status data information is more than one minute late, the late information is discarded.

When status data information is received, whether by means of a push sequence (in which one or more network devices 111 send the status data information without having been requested), or a pull sequence (in which one or more network devices 111 are specifically requested by the network monitoring device 112 to provide status data information), the network monitoring device 112 determines a start and end time for the status data information, parcels out the status data information into multiple clock ticks 202 if necessary, and maintains the status data information at the appropriate clock ticks 202.

In one embodiment, the network monitoring device 112 can maintain the status data information in a database 130, whether a relatively local database 130 such as one coupled substantially directly to the communication network 110, or a relatively remote database 130 such as one coupled only substantially indirectly (that is, by means of other devices) to the communication network 110.

FIG. 3

FIG. 3 shows a conceptual drawing of a method of operation.

A method 300 includes flow points and method steps as described herein, other elements shown in the figure, and possibly other elements. Not all elements are required. Elements should be considered optional, unless otherwise specified or unless clearly obvious for operation of the system.

These flow points and method steps are, by the nature of the written word, described in one particular order. This description does not limit the method to this particular order. The flow points and method steps might be performed in a different order, or concurrently, or partially concurrently, or otherwise in a parallel, pipelined, quasi-parallel, or other manner. They might be performed in part, paused, and returned to for completion. They might be performed as co-routines or otherwise. In the context of the invention, there is no particular reason for any such limitation.

One or more portions of the method 300 are sometimes described as being performed by particular elements of the system 100 described with respect to FIG. 1, or sometimes by "the method" itself. When a flow point or method step is described as being performed by "the method," it can be performed by one or more of those elements, by one or more portions of those elements, by an element not described with respect to the figure, by a combination or conjunction thereof, or otherwise.

In possible implementations, a method 200 includes flow points and method steps as described herein, other elements shown in the figure, and possibly other elements. Not all flow points or method steps are required. Flow points or method steps should be considered optional, unless otherwise specified or unless clearly obvious for operation of the system.

The system 100, or portions of the system 100, can or be used while performing the method 200, or portions of the method 200. Where described herein that a flow point is reached, or a step is performed, by the method 200, it should be understood from the context, or from the figure, which portions (or all of them) of the system 100, reaches the flow point or takes the actions to perform the step.

Although the nature of text necessitates that the flow points and steps are shown in a particular order, in the context of the invention, there is no reason for any such limitation. The flow point may be reached, and the steps may be per-formed, in a different order, or may be performed by co-routines or recursive functions, or may be performed in a parallel or pipelined manner, or otherwise.

FIG. 3, Flow Points and Method Steps

General Process Overview

A general process can include steps such as the following:

In one embodiment, the network monitoring device 112 maintains a buffer 201, including at least one spot for each clock tick 202 at which status data information can be maintained. In one embodiment, the buffer 201 can be maintained at a relatively local database 130, as described herein; however, the buffer 201 may alternatively be maintained at a relatively remote database 130, such as one that is accessible using the communication network 110.

The network devices 111 send push status data information, in message packets 113, to the network monitoring device 112. The network monitoring device 112 receives the message packets 113, parses them to determine the status data information, and determines their appropriate clock ticks 202, at which they should be placed in the buffer 201. The network monitoring device 112 places the status data information in the buffer 201.

The push status data information can include any information relating to exchanges between network devices 111, including status data information with respect to network traffic (such as with respect to communication between network devices 111 using the communication network 110), computing devices 120, virtual machines 122, virtual desktop implementations 129, databases 130, and any other elements coupled to the system 100.

In one embodiment, the network monitoring device 112 can maintain status data information with respect to any pair of objects (such as with respect to communication between a selected computing device 120 and a selected data store 131), and/or with respect to any type of interaction (such as with respect to whether the selected computing device 120 and the selected data store 131 are exchanging relatively short message packets 113 or relatively long message packets 113), and/or combinations or conjunctions thereof. For example, the network monitoring device 112 can maintain status data information with respect to whether a particular user 128 is using the HTTP protocol (port 8080 on a computing device 120, or on a virtual machine 122, or detected by a virtual desktop implementation 129, or otherwise).

In one embodiment, the network monitoring device 112 can manage its communication with network devices 111 that do not choose to push status data information to it. For example, one or more virtual machines 122 might choose to report status data information only if requested. In such cases, the network monitoring device 112 determines how much load will be needed by itself, and by the network device 111, just for making requests for status data information; determines how much load will be needed, depending on how frequently it asks for status data information, and for how much status data information; and determines if the network device 111 will provide too little fidelity if it requests more status data information than the network device 111 is comfortable with providing.

In one embodiment, the network monitoring device 112 sends requests to, and receives responses from, network devices 111, with the effect that it receives status data information from those network devices 111. The network monitoring device 112 determines the format in which it receives the status data information, converts that status data information (if necessary) into a common format with all other network devices 111, determines start and end clock ticks 202 for the status data information, parcels out the status data information (if appropriate) among clock ticks 202, and maintains the status data information in the buffer 201.

Beginning of Method

A flow point 200A indicates that the method 200 is ready to start.

At this flow point, the method 300 can initialize variables and reset/set state, as appropriate.

The method 300 proceeds with both flow points 320A and 340A. In one embodiment, this can be conducted in parallel, and the method 300 can perform the steps following those flow points in parallel, concurrently, or in any other reasonably convenient order, as determined by the network monitoring device 112.

"Push" Status Data Information

A flow point 320A indicates that the method 300 is ready to receive "push" status data message packets 113, which can include status data information with respect to network traffic, computing devices (hosts for virtual machines 122), virtual machines 122, real and virtual data stores. At this flow point, the method 300 can initialize variables for receiving "push" status data message packets 113, as appropriate.

At a step 331, the network devices 111 determine push status data information to be sent to the network monitoring device 112. In one embodiment, the push status data information can relate to any interaction between elements in the system 100, including all network devices 111, computing devices 120, virtual machines 122, virtual desktop implementations 129, databases 130, and any other elements coupled to the system 100.

At a step 332, the network monitoring device 112 receives the status data information in one or more message packets 113, parses the status data information, determines a start and end time for the status data information, and determines at which clock ticks 202 the status data information should be maintained. The network monitoring device 112 maintains the status data information in the buffer 201.

At a step 333, the network monitoring device 112 determines if the status data information should be parceled out to more than one such clock tick 202. For example, one or more network devices 111 might provide more than one second of status data information. If so, the network monitoring device 112 parcels out the amount of status data information, assuming that activity has been performed in a substantially uniform distribution. In one example, if the one or more message packets 113 indicate that there have been 500 data store requests in 10 seconds, the network monitoring device 112 assumes that each one second had 50 such data store requests. In another example, if one or more message packets 113 indicate that there have been 50 virtual application operations between 2.00 and 3.25 seconds into the one-minute buffer 201 (thus, a total of 1.25 seconds), the network monitoring device 112 assumes that 40 of those operations occurred between 2.00 and 3.00 seconds, and maintains them at the clock tick 202 for 2.00 seconds, and that 10 of those operations occurred between 3.00 and 3.25 seconds, and maintains them at the clock tick 202 for 3.00 seconds. If any of these operations could involve partitioning the message packets 113, the network monitoring device 112 duplicates the message packets 113, and adjusts their values to indicate the computed measures for each separate message packet 113.

At a step 334, the network monitoring device 112 advances its clock tick 202 (clearing the status data for that clock tick 202 so that new status data can be maintained at that clock tick 202 for the next minute), and presents the measures for each value (that is, for all network devices 111 and for all combinations thereof) to an operator, who might also be a user 128. For status data information that is accurate to each clock tick 202, the network monitoring device 112 presents the value for that clock tick 202. For status data information that is only accurate to a larger measure (such as some virtual machines 122 that sometimes only provide status data information accurate to 20 seconds, the network monitoring device 112 reports the same measure for all 20 of those seconds, until a new measure is available.

A flow point 320B indicates that the method 300 is ready to continue to receive "push" status data message packets 113. The method 300 returns to the earlier flow point 310A.

"Pull" Status Data Information

A flow point 340A indicates that the method 300 is ready to receive "pull" status data message packets 113, which can include status data information with respect to network traffic, computing devices (hosts for virtual machines 122), virtual machines 122, real and virtual data stores, as described above with respect to "push" status data message packets 113. At this flow point, the method 300 can initialize variables for receiving "push" status data message packets 113, as appropriate.

At a step 351, the network monitoring device 112 determines a measure of how many requests, and how much information, it should request from the network device 111. For example, if the network device 111 is a very busy virtual machine 122, the network monitoring device 112 could determine that it should not make too many requests, that they should not request too much status data information, and/or some combination or conjunction thereof. In one embodiment, the network monitoring device 112 re-determines the results of this step periodically (or otherwise with some selected frequency), so as to manage its connection with the network device 111.

At a step 352, the network monitoring device 112 sends requests to, and receives responses from, network devices 111, with the effect that it receives status data information from those network devices 111.

At a step 353, the network monitoring device 112 determines the format in which it receives the status data information, converts that status data information (if necessary) into a common format with all other network devices 111, determines start and end clock ticks 202 for the status data information, parcels out the status data information (if appropriate) among clock ticks 202, and maintains the status data information in the buffer 201, similar to as described above with respect to the pull status data information circumstance.

A flow point 340B indicates that the method 300 is ready to continue to receive "push" status data message packets 113. The method 300 returns to the earlier flow point 310A.

Method Completed

A flow point 200B indicates that the method 200 has been completed.

In possible implementations, the user 101 could repeat the method 200 to move to another location, or to move between a sitting and standing position, or between other positions. For example, the user 101 could move from the target user chair 103 back to the source user chair 102.

When the user 101 desires to repeat the method 200, the method 200 proceeds with the flow point 200A.

Alternative Embodiments

While this application is primarily described with respect to push pull data collection, after reading this Application, those of ordinary skill in the art will recognize that there is no particular requirement for any such limitation. For example, techniques described herein can also be applied to other circumstances in which it is desired to retrieve dynamic data and collate that dynamic data (possibly received out of order) into a unified sequence, which is in an specified order. For example, the techniques described and suggested herein (including machines, methods, articles of manufacture, and compositions of matter) can be applied to any time-sensitive system, including sensors, robotics, machine learning, dynamic compression and expansion of data streams, or otherwise.

Similar Elements or Steps

Individual elements or method steps of the described embodiments could be replaced with substitutes that perform similar functions in other contexts.

Elements of the system are described herein with respect to one or more possible embodiments, and are not intended to be limiting in any way. In the context of the invention, there is the particular requirement for any such limitations as described with respect to any elements of the system. For one example, individual elements of the described apparatuses could be replaced with substitutes that perform similar functions. Moreover, as described herein, many individual elements of the described apparatuses are optional, and are not required for operation.

Moreover, although control elements of the one or more described apparatuses are described herein as being executed as if on a single computing device, in the context of the invention, there is no particular requirement for any such limitation. For one example, the control elements of the one or more described apparatuses can include more than one computing device (or more than one specialized computing device), not necessarily all similar, on which the element's functions are performed.

For one example, while some embodiments are generally described herein with respect to specific steps to be performed by generalized computing devices, in the context of the invention, there is no particular requirement for any such limitation. In such cases, subject matter embodying the invention can include special-purpose devices; and can include special-purpose hardware devices having the elements described herein, and having the effect of performing the steps described herein; and combinations and/or conjunctions thereof. Embodiments of the invention are not necessarily limited to computing de-vices, but can also include any form of device or method that can improve techniques for improving the effect of the machine operations described herein.

In one particular implementation, instructions capable of being interpreted for control of devices can be provided as a computer program product, such as instructions that are maintained on a computer-readable storage medium or a non-transitory machine-readable medium. The non-transitory medium can include a magnetic, optical or magneto-optical storage medium; a flash storage medium; and/or otherwise.

Specification not Limiting

After reading this Application, those skilled in the art would recognize that the invention is not limited to only the specifically described embodiments, that many variations are within the scope and spirit of the invention, and would be workable without undue experiment or further invention.

Claims Included in Specification

The Claims in this Application are hereby included by reference in the text of the Specification.

The invention claimed is:

1. Apparatus including
a network monitoring device coupleable to a computer network, said computer network coupleable to at least one first type of device sending network data on their own behest, and at one second type of device sending network status data upon the request of said network monitoring device;
said network monitoring device including a buffer of said network status data, being divided into a plurality of clock ticks, each clock representing status data from a discernable past time;
wherein when said network monitoring device divides said network status data among said plurality of clock ticks, said network monitoring device spreads said network status data items among said multiple clock ticks in a substantially uniform distribution;
when said network monitoring device maintains status data from said network at least temporarily in said buffer, at a location associated with said discernable past time; and
when said discernable past time exceeds a selected threshold, said network monitoring device throttling back the amount of said status data from a selected discernable past time associated with said selected threshold.

2. Apparatus including
a network monitoring device, the network monitoring device responsive to network status data from one or more devices coupled to a network;
wherein the network monitoring device including a database responsive to the network status data, the database including one or more distinct entries for distinct clock ticks for a finite recent time duration, each clock tick representing a known time duration relative to a current time;
wherein when the network monitoring device receives first network status data for a first time duration associated with an identifiable clock tick, the network monitoring device maintains the first network status data associated with the identifiable clock tick;
wherein when the network monitoring device receives second network status data for a second time duration associated with a plurality of identifiable clock ticks, the network monitoring device divides network status data items, determined from the network status data, among the plurality of identifiable clock ticks; and
wherein when the network monitoring device divides the network status data among the plurality of identifiable clock ticks, the network monitoring device spreads the network status data items among the plurality of identifiable clock ticks in a substantially uniform distribution.

3. Apparatus as in claim 2,
wherein the finite recent time duration is a selected number of clock ticks.

4. Apparatus as in claim 2,
wherein the one or more devices coupled to the network include a first device and a second device, the first device sending the network status data on its own behest, and the second device sending the network status data in response to one or more requests from the network monitoring device.

5. Apparatus as in claim 4,
wherein the network monitoring device manages requests for network status data from the second device in response to one or more of:
a selected amount of network status data to receive, a selected amount of load on the second device, a selected amount of load on the network monitoring device.

6. Apparatus as in claim 2,
wherein the one or more devices coupled to the network provide the network status data in one or more message packets, from which the network monitoring device can determine the one or more network status data items.

7. Apparatus as in claim 2,
wherein when the network monitoring device receives the network status data, the network monitoring device computes individual network status data items in response to network status data representative of a first and a second register value associated with a reported time duration.

8. Apparatus as in claim 2,
wherein when the second network status data crosses a clock tick boundary, the network monitoring device divides the network status data into a first and a second portion, assigning the first portion to a first clock tick and the second portion to a second clock tick.

9. A method of operating a network monitoring device, the method including steps of
coupling the network monitoring device to one or more devices coupled to a network;
receiving network status data from the one or more devices, one or more network status data items being determinable from the network status data;
maintaining the one or more network status data items in a database, the database including one or more distinct entries for distinct clock ticks for a finite recent time duration, each clock tick representing a known time duration relative to a current time;
upon receiving the network status data for a time duration associated with a plurality of identifiable clock ticks, dividing network status data items, determined from the network status data, among those identifiable clock ticks;
wherein dividing the network status data among multiple clock ticks includes steps of spreading the network status data items among those multiple clock ticks in a substantially uniform distribution; and
managing requests for the network status data in response to one or more of: a selected amount of network status data to receive, a selected amount of load on the second device, a selected amount of load on the network monitoring device.

10. A method as in claim 9,
wherein receiving the network status data
includes steps of
computing individual network status data items in response to network status data representative of a first and a second register value associated with a reported time duration.

11. A method as in claim 9,
wherein receiving the network status data occurs in one or more message packets, from which the network monitoring device can determine the one or more network status data items.

12. A method as in claim 9,
wherein the finite recent time duration is a selected number of clock ticks.

13. A method as in claim 9,
wherein when the second network status data crosses a clock tick boundary, the network monitoring device divides the network status data into a first and a second portion, assigning the first portion to a first clock tick and the second portion to a second clock tick.

* * * * *